(12) United States Patent
Lou et al.

(10) Patent No.: US 7,264,650 B2
(45) Date of Patent: Sep. 4, 2007

(54) ULTRAHIGH-SELECTIVITY OXYGEN ENRICHMENT FILLED ELASTOMERIC SILICONE POLYMER MEMBRANE INCORPORATING NANOFILLERS

(75) Inventors: Jianzhong Lou, Oak Ridge, NC (US); Arvind Vyas Harinath, Greensboro, NC (US); Shamsuddin Ilias, Greensboro, NC (US); Jag Sankar, Greensboro, NC (US)

(73) Assignee: North Carolina Agricultural and Technical State University, Greensboro, NC (US)

( * ) Notice: Subject to any disclaimer, the term of this patent is extended or adjusted under 35 U.S.C. 154(b) by 39 days.

(21) Appl. No.: 11/128,474

(22) Filed: May 13, 2005

(65) Prior Publication Data

US 2005/0284294 A1    Dec. 29, 2005

Related U.S. Application Data

(60) Provisional application No. 60/582,472, filed on Jun. 24, 2004.

(51) Int. Cl.
*B01D 53/22* (2006.01)
*B01D 69/12* (2006.01)
*B01D 71/70* (2006.01)

(52) U.S. Cl. .................. 95/54; 95/45; 96/4; 96/11; 96/12; 96/13; 96/14

(58) Field of Classification Search .............. 96/4, 96/11, 12, 13, 14; 95/45, 54; 55/486, 487, 55/495; 427/245, 372.2, 385.5
See application file for complete search history.

(56) References Cited

U.S. PATENT DOCUMENTS

| | | | |
|---|---|---|---|
| 4,740,219 A | 4/1988 | Kulprathipanja et al. | |
| 4,925,459 A | 5/1990 | Rojey et al. | |
| 4,925,562 A | 5/1990 | te Hennepe et al. | |
| 5,127,925 A | 7/1992 | Kulprathipanja et al. | |
| 5,703,359 A * | 12/1997 | Wampler, III | 96/11 |
| 5,753,009 A * | 5/1998 | Sirkar et al. | 95/45 |
| 6,447,856 B1 * | 9/2002 | Meagher et al. | 427/601 |
| 6,503,294 B2 * | 1/2003 | Yoshikawa et al. | 95/45 |
| 6,726,744 B2 * | 4/2004 | Kulprathipanja et al. | 95/45 |

FOREIGN PATENT DOCUMENTS

| | | | |
|---|---|---|---|
| FR | 2 776 534 A1 * | 10/1999 | |
| JP | 58-95524 | * | 6/1983 |
| JP | 59-69105 | * | 4/1984 |

* cited by examiner

*Primary Examiner*—Jason M. Greene
(74) *Attorney, Agent, or Firm*—Myers Bigel Sibley & Sajovec, P.A.

(57) ABSTRACT

A semipermeable separation element includes (a) a porous substrate, and (b) a film formed on the microporous substrate; the film comprising a silicone elastomer and a nanoparticle filler. The film preferably has an oxygen enrichment selectivity of at least 30, or even 60, over nitrogen. Methods of making and using the same and filter cartridges incorporating the same are also described.

16 Claims, 3 Drawing Sheets

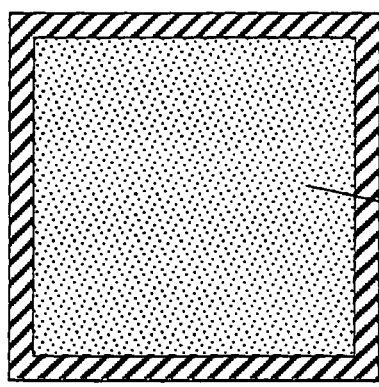
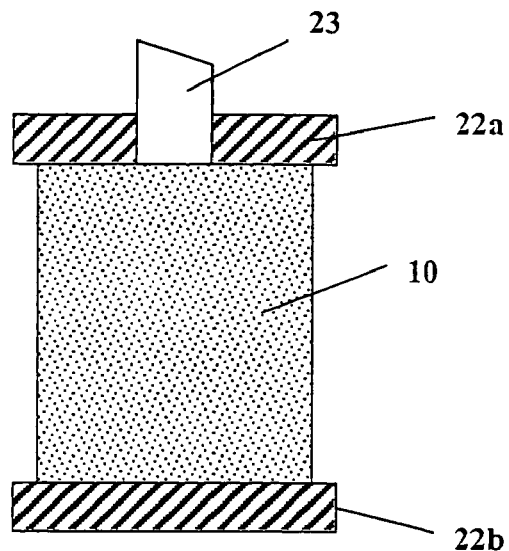
Figure 4
Figure 5
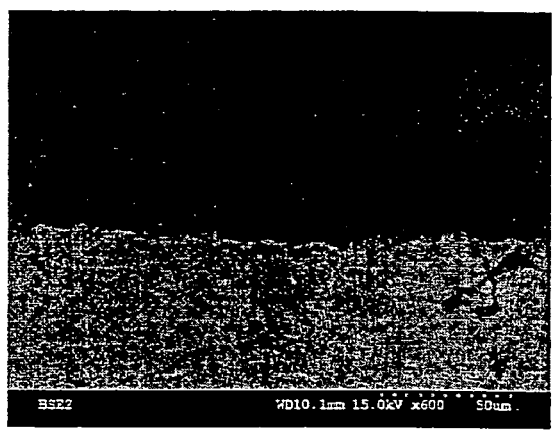
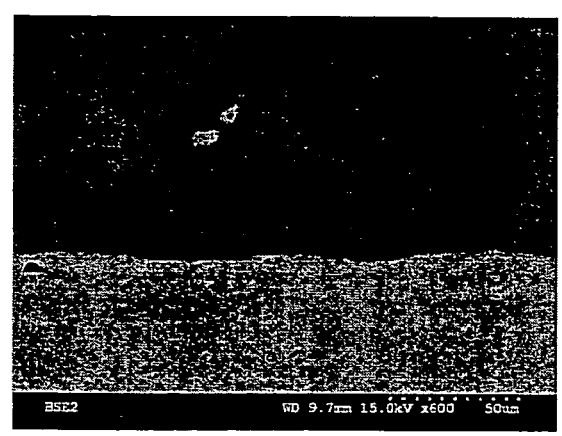
Fig. 6 Cross-section view of neat polymer and filled polymer on metallic substrates.

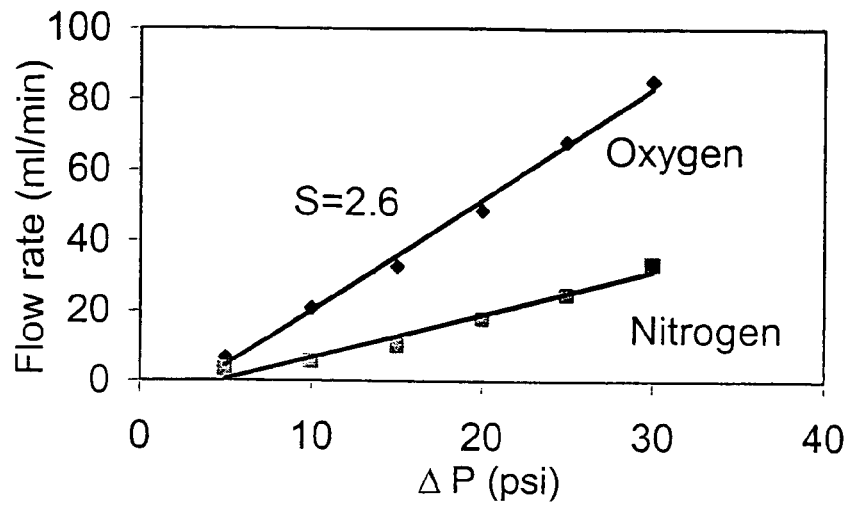
Fig. 7: Permeate flow rate as a function of transmembrane pressure for different gases of neat silicone polymer.
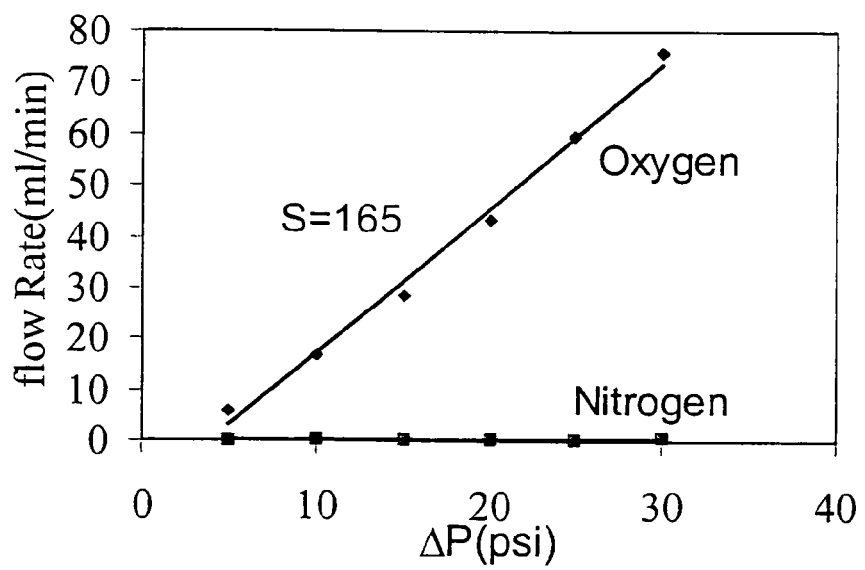
Fig. 8: Gas permeation flow rate as a function of transmembrane pressure for different gases for filled silicone polymer.

ULTRAHIGH-SELECTIVITY OXYGEN ENRICHMENT FILLED ELASTOMERIC SILICONE POLYMER MEMBRANE INCORPORATING NANOFILLERS

RELATED APPLICATIONS

This application claims the benefit of U.S. Provisional Patent Application Ser. No. 60/582,472, filed Jun. 24, 2004, the disclosure of which is incorporated by reference herein in its entirety.

FIELD OF THE INVENTION

The present invention concerns semipermeable membranes or filter media, methods of making and using the same, and apparatus incorporating the same.

BACKGROUND OF THE INVENTION

Filled polymers are a special grade of composites that represent unique application promises in chemical sensing element, functional extrusion films, gas separation membranes, solvent-free coatings and maskants, and light-weight composites with high thermo-oxidative stability [J. Lou, "Filled polymers", in *Encyclopedia of Chemical Processing*, S. Lee, ed., Marcel Dekker, New York, N.Y., 2004].

One particular area most relevant to chemical engineers is the gas separation membranes [R. W. Baker and J. G. Wijmans, "Membrane separation of organic vapors from gas streams," in *Polymeric Gas Separation Membranes*, D. R. Paul and Y. P. Yampolskii, eds., CRC Press, Boca Raton, Fla., 1994]. Significant changes in free volumes are expected of non-crystalline polymers by incorporating selected filler particles whose dimensions enable them to interfere with the packing of the polymer chains. It is possible that nanofillers will influence the packing density of glassy and rubbery polymers thus change the permeability of the polymer and at the same time change the selectivity if such influences are gas-specific. Elastomeric silicones of chosen molecular weight are among the polymers that we feel have a great likelihood to be modified by fillers to create high performance perm-selective membranes by adjusting the loading and binding details of filler particles in the polymer matrix. Such flexible filled polymer composites are expected to have much different permeabilities compared with conventional membranes without nanofiller interference. When the size of the fillers is at the molecular level the nature of the filler impact changes. This is an exciting area, not only promising in applications but also bearing potential for significant theoretical breakthroughs.

SUMMARY OF THE INVENTION

We herein describe our latest discoveries on nanofiller filled silicone formulations that are coated (e.g., spin-coated) onto microporous substrates and exhibited unprecedented superior high-selectivity in its oxygen-enrichment membrane properties. The impact of the nanofillers on the membrane was a surprisingly high increase in selectivity of more than 30-fold.

A first aspect of the present invention is a semipermeable separation element, comprising or consisting essentially of: (a) a porous substrate, and (b) a film formed on said porous substrate; said film comprising a silicone elastomer and a nanoparticle filler. In some embodiments the nanoparticle filler comprises, consists of or consists essentially of non-porous nanoparticles; in some embodiment the nanoparticles preferably comprises, consists of or consists essentially of particles of from 5 to 100 nanometers in diameter, in some embodiments the film preferably has a thickness of from 0.5 to 50 microns, and in some embodiments the film preferably has an oxygen enrichment selectivity of at least 30, or even 60, over nitrogen.

A second aspect of the present invention is a method of making a separation element as described above comprising the steps of: (a) providing a porous substrate; (b) coating said substrate with a composition comprising, in combination, monomer precursors of said silicone elastomer and said nanoparticles; and then (c) polymerizing said composition on said substrate to form a film and make a separation element as described above.

A further aspect of the present invention is a method of enriching oxygen as compared to nitrogen in a gas, comprising the steps of: (a) contacting a source gas to one side of a semipermeable separation element as described above under pressure, said source gas comprising oxygen and nitrogen, and then (b) collecting a product gas from the opposite side of said separation element, with the ratio of oxygen to nitrogen being greater in said product gas than in said source gas.

A further aspect of the present invention is an oxygen enrichment device, comprising: (a) a semipermeable separation element as described above, said separation element having a first face and a second face opposite said first face; (b) a source gas supply operatively connected to said first face; and (c) a product gas collector operatively connected to said second face.

A further aspect of the present invention is a filter cartridge having a mounting member and a filter medium operatively associated therewith, and incorporating as an improvement a semipermeable separation element as described above as the filter medium.

The foregoing and other objects and aspects of the present invention are explained in greater detail in the drawings herein and the specification set forth below.

BRIEF DESCRIPTION OF THE DRAWINGS

FIG. 4 is a first example of a filter cartridge of the present invention.

FIG. 5 is a second example of a filter cartridge of the present invention.

FIG. 6: Cross-section view of neat polymer and filled polymer on metallic substrates.

FIG. 7: Permeate flow rate as a function of transmembrane pressure for different gases of neat silicone polymer. S is the estimated oxygen enrichment selectivity obtained from the ratio of the slopes.

FIG. 8: Gas permeation flow rate as a function of transmembrane pressure for different gases for filled silicone polymer. S is the estimated oxygen enrichment selectivity obtained from the ratio of the slopes.

DETAILED DESCRIPTION OF THE PREFERRED EMBODIMENTS

The present invention is explained in greater detail below. This description is not intended to be a detailed catalog of all the different ways in which the invention may be implemented, or all the features that may be added to the instant invention. For example, features illustrated with respect to one embodiment may be incorporated into other embodiments, and features illustrated with respect to a particular embodiment may be deleted from that embodiment. In addition, numerous variations and additions to the various embodiments suggested herein will be apparent to those skilled in the art in light of the instant disclosure which do not depart from the instant invention. Hence, the following specification is intended to illustrate some particular embodiments of the invention, and not to exhaustively specify all permutations, combinations and variations thereof. Applicants specifically intend that the disclosures of all United States patent references cited herein be incorporated herein by reference in their entirety.

Figure 1:
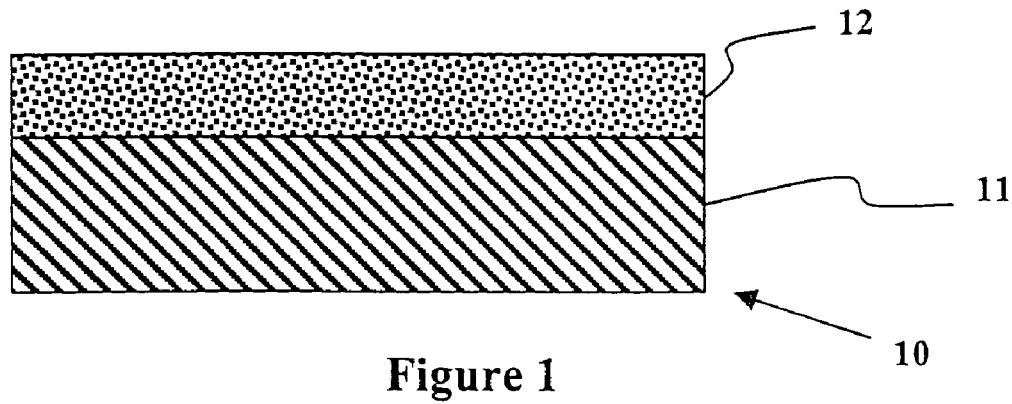
FIG. 1: A semipermeable separation element of the present invention.

As schematically illustrated in FIG. 1, a separation element 10 of the invention generally comprises a porous substrate 11 having a film 12 formed on the porous substrate.

Porous substrates 11 used to carry out the present invention can be of any suitable material, including inorganic materals such as metals and ceramics, organic polymers, or composites thereof. The solid support is porous or microporous, e.g., having channels or passages therein sufficiently large to permit gas molecules to pass therethrough, but sufficiently small to provide structural support to the polymer film. The thickness and physical form of the porous substrate is not critical, but in some embodiments is preferably in the form of flexible sheet material.

The film 12 generally comprises an organic polymer, and preferably a silicone elastomers. Silicone elastomers may be formed of any suitable material, including methyl chlorosilane, ethyl chlorosilane, or phenyl chlorosilane, including combinations and copolymers and terpolymers thereof (e.g., with other monomers such as acrylate monomers). The silicone elastomer is in some embodiments preferably a curable polyorganosiloxane (this term again including copolymers and terpolymers with other monomers), such as described in U.S. Pat. No. 6,384,125, the disclosure of which is incorporated herein by reference. One preferred silicone silicone elastomer comprises polydimethylsiloxane.

Nanoparticles used to carry out the present invention can be of any suitable material such as magnesium silicate or talc, mica, silica, alumina, aluminum silicate, fumed silica, silane modified silica, and mixture thereof. See, e.g., U.S. Pat. No. 6,682,872. The particles are preferably nonporous. The particles may be of any suitable size but are preferably about 5 to 100 nanometers in diameter. While the nanoparticles are sometimes referred to as a "filler" herein, it will be appreciated that the nanoparticles in fact contribute to the functionality of the membrane. Without wishing to be bound to any particular theory of the invention, it is believed that the nanoparticles contribute to the alternation of gas transport process in a polymer by effecting changes in the way the polymer chains are organized/packed and by providing additional variables to the complex gas-polymer interactions with the presence of the interfaces between the filler particles and the polymer.

In general, separation elements 10 of the invention can be produced by (a) providing a porous substrate as described herein; (b) coating said substrate with a precursor composition comprising, in combination, monomer precursors of said silicone elastomer and said nanoparticles; and then (c) polymerizing the composition on said substrate to form a film and make a separation element as described herein. The precursor composition will typically include an organic solvent such as butanone, ethyl phenyl ether, toluene, benzene, chlorobenzene, bromocyclohexane, other aromatic hydrocarbons that have a solubility perameter close to that of the silicone polymer or mixtures thereof, the amount of the solvent depending upon the desired thickness of the film and the particular coating technique used. A polymerization initiator, or a catalyst, may be included in the precursor composition and polymerization is carried out once the substrate is coated with the precursor composition by any suitable technique. The coating technique is not critical and, while spin-coating is useful for generating laboratory-scale samples, other coating techniques such as spray coating, dip coating, meniscus coating, doctor-blading, etc., may be utilized to produce larger quantities of the invention.

The amount of nanoparticle filler by weight in the film, as compared to the polymer, will depend upon the particular polymer or polymer composition employed, the thickness of the film, the size of the particles, etc. In general the amount by weight of polymer will be greater than the amount by weight of particles, and hence the nanoparticles will generally constitute from about 0.1 percent by weight to about 40 percent by weight of the film, and the amount of the polymer will constitute from 99.9 to 60 percent by weight of the film. Currently 2 to 2.5 percent nanoparticles by weight, more particularly 2.2 percent nanoparticles by weight, is preferred. In our particular experiments with the specific polymer composition and nanoparticles employed, particle amounts of 1 or 3 percent by weight did not produce the desired oxygen selectivity. The best results are obtained when the population of the filler particles is around (e.g., plus or minus 2 percent, more preferably plus or minus 1 percent, still more preferably plus or minus 0.5 percent, and most preferably plus or minus 0.2 percent) the theoretical percolation point. The theoretical percolation point is the minimum total mass of all particles corresponding to the minimum number of particles needed to form the first particle clusters that penetrates throughout the entire polymer host by chance (the way the particles are distributed in space and whether or not they form clusters is random and completely uncontrolled). As the average size (diameter) of the particles decreases, the number of particles for a given mass (weight) increases rapidly; and the theoretical percolation point (critical mass) also decreases. For example, fillers of 12 nm in diameter may reach percolation at a load of only 2.2% by weight (2.2% filler weight, 97.8% polymer weight) whereas fillers of 12 micronmeter in diameter reach percolation at a load of about 34% by weight (34% filler weight and 66% polymer weight). The actual best result will depend on other factors such as the aspect ratio as well as the size distribution of the filler particles.

Figure 2:
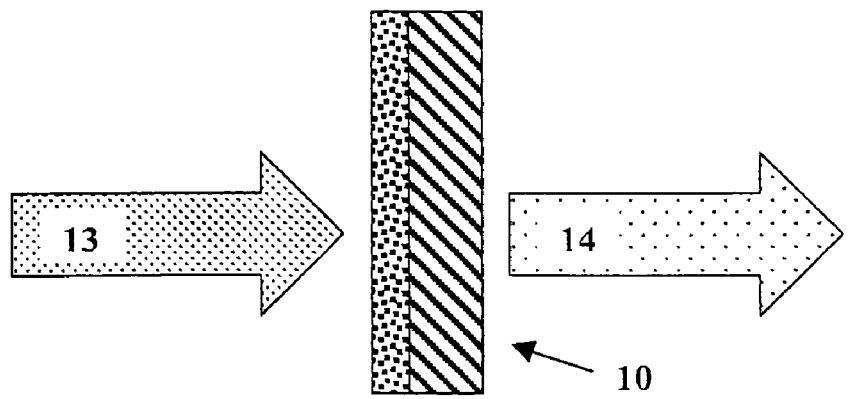
FIG. 2: Method of using a separation element of the present invention.
Figure 3:
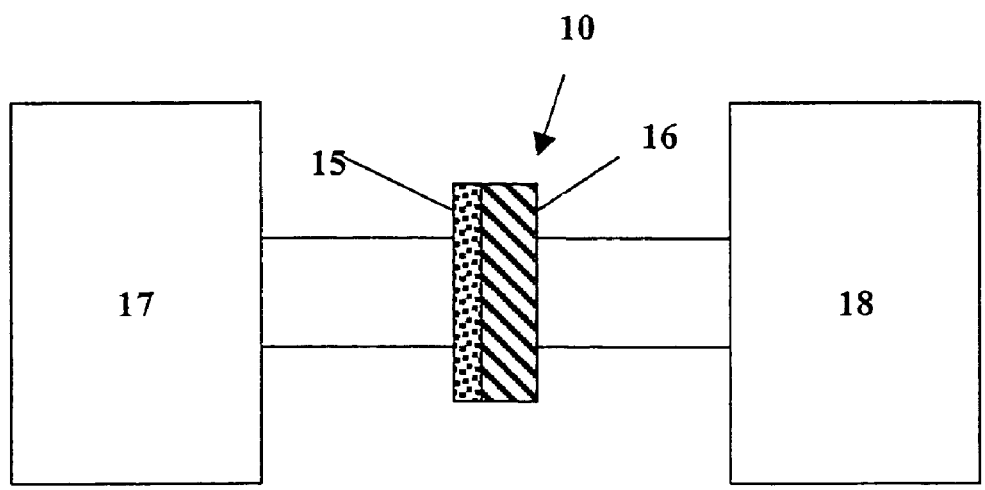
FIG. 3: Schematic diagram of an apparatus incorporating a separation element of the invention.

A method of enriching oxygen as compared to nitrogen in a gas stream of the present invention is schematically illustrated in FIG. 2. In general, the method comprises the steps of: (a) contacting a source gas such as air 13 to one side of a semipermeable separation element 10 of the invention under pressure, the source gas comprising oxygen and nitrogen, and then; (b) collecting a product gas 14 from the opposite side of the separation element, with the ratio of oxygen to nitrogen being greater in the product gas than in said source gas. An oxygen enrichment device of the invention, schematically illustrated in FIG. 3, generally comprises (a) a semipermeable separation element of the invention, the separation element having a first face 15 and a second face 16 opposite said first face; (b) a source gas supply 17 for providing a source gas under pressure operatively connected to the first face; and (c) a product gas collector 18 operatively connected to the second face. The pressure of the source gas is not critical and will depend upon the particular application for which the separation element is used, but will generally be greater than atmospheric pressure, in some embodiments is greater than 20 or 100 psi. In order to maintain the pressure on the source gas and prevent the nitrogen from accumulating in the source gas, a bleed must be provided to the source gas to regularly release nitrogen and at the same time maintaining the pressure. The preferred design is to face the porous substrate support material with the low pressure side.

In practice the separation elements 10 of the invention can be provided in the form of a replaceable filter cartridge configured to be removably inserted into a chamber or other suitable receptacle for operative association with a source gas supply and a product gas collector. Such filter cartridges can take any of a variety of different physical forms, but generally include a mounting member and a filter medium operatively associated therewith, with the filter medium comprising the separation element of the invention (optionally associated with other elements such as further support structures, course filtration elements, etc.). For example, as shown in FIG. 4, the mounting member may be a mouting frame, 22 with the separation element 10 connected to the mounting frame (as a flat sheet, pleated sheet, or in any other manner). In another example as shown in FIG. 5, the mounting member may comprise a pair of end caps 22a, 22b, with one of the end caps having an inlet port 23 connected thereto, and with the separation element 10 configured as an enclosed chamber (e.g., a cylinder; and which again may be flat, pleated, etc.) and interconnecting the two end caps so that source gas may pass through the inlet port 23 and through the separation element 10. Numerous other configurations are possible, depending upon the particular device into which the separation element is to be incorporated.

EXPERIMENTAL

The silicone elastomer base (primarily polydimethylsiloxane) materials were received from Dow Corning. Elastomer grade dimethylsiloxane from Dow Corning is preferred. The curing agent was based on addition polymerization and did not produce volatile by-products. Dow Corning dimethyl siloxane (Sylgard 184) was preferred as the curing agent. The curing agent was added to the elastomer base at 1:10 w/w ratio, followed by continuous stirring for a period of 30 minutes. TS-530 fumed silica nanofillers whose nominal particle size is 13 nm were received from Cabot and were added and further mixed. An aromatic diluent was added to control the rheology of the spin coating process (butanone, ethyl phenyl ether, toluene, benzene, chlorobenzene, bromocyclohexane, or any aromatic hydrocarbon that has a solubility parameter close to that of the silicone polymer of choice may be used as the diluent.

A Specialty Coating Systems Model G3 programmable spincoater was used to cast the membrane onto 2-in diameter microporous sintered stainless steel substrates (nominal pore size is 0.2 μm, such as the material supplied by Mott Corporation, Farmington, Conn. 06032). The spincoater was programmed with the ramp-up time of five seconds, rotational speed of 2000 rpm, and the dwell period of four minutes. The membrane disks were first dried in a convection oven for a period of 12 hrs at 80° C. before use. The weight loss was used to ensure that the diluent was completely vaporized. At lease two independent methods were used to determine the thickness of the membrane skin layer. As an example, the scanning electron microscopy (Oxford EDX interfaced with Hitachi S-3000N SEM) and surface profilometer were both used to determine the thickness of the polymer film coated on the substrate disks.

A series of pure gas permeation experiments were conducted to estimate the properties of the membranes. The membrane disk was mounted on the stainless steel membrane coupling holder rated for 300 psi. Leaks and seals were checked before the steady state permeation experimental data were recorded. The experiment was repeated with pure oxygen and then pure nitrogen respectively.

Results and Discussion.

FIG. 6 shows the cross-section view of the membranes on the stainless steel substrates from electron microscopy. FIG. 7 and FIG. 8 show the permeate flow rate as a function of the trans-membrane pressure for neat silicone and filled silicone, respectively. The slope is determined. The ratio of the two slopes for the pure oxygen and pure nitrogen gives the estimate for the selectivity of the membrane with respect to oxygen-enrichment.

While the permeability did not show significant change, the selectivity as estimated showed superior increase from 2.6 for neat polymer to greater than 60 for filled polymer. We repeated the experiments and found that the results were reproducible with reasonable variations.

This discovery was not consistent with the recent work by Merkel et al who reported that by introducing nanofillers into a different polymer, poly(4-methyl-2-pentyne), they observed increase in both permeability by about 3-fold at low loadings and increase in n-butane/methane selectivity from about 16 to 21 [T. C. Merkel; Freeman, B. D.; Spontak, R. J.; He, Z.; Pinnau, I.; Meakin, P.; Hill, A. J., "Ultrapermeable, reverse-selective nanocomposite membranes", *Science*, 296(5567), 519-522 (2002); T. C. Merkel; Freeman, B. D.; Spontak, R. J.; He, Z.; Pinnau, I.; Meakin, P.; Hill, A. J., "Sorption, transport, and structural evidence for enhanced free volume in poly(4-methyl-2-pentyne)/fumed silica nanocomposite membranes", *Chemistry of Materials*, 15(1), 109-123 (2003)]. They had contributed such increase in permeability to possible interference of the nanofillers to the molecular packing of noncrystalline polymer. Our data supported conventional theory in that fillers tend to create more difficult diffusion paths for permeating molecules and lead to decrease in permeability. What was interesting was we discovered that the degree at which the same fillers reduced the permeability for oxygen was totally different from that for nitrogen. This caused the observed ultrahigh selectivity which was unprecedented. Whether or not the selectivity was controlled by the size of the molecules and the interactions between the molecules and the surfaces of the fillers remain to be investigated. Since silicone polymers are well known for their high free volume characteristics, this trade-off of slight reduction in permeability and drastic increase in selectivity seems to be commercially very useful.

These data show that ultrahigh oxygen enrichment selectivity (as high as 60 or more) for filled silicone polymers.

The foregoing is illustrative of the present invention, and is not to be construed as limiting thereof. The invention is defined by the following claims, with equivalents of the claims to be included therein.

That which is claimed is:

1. A method of enriching oxygen as compared to nitrogen in a gas, comprising the steps of:
   (a) contacting a source gas to one side of a semipermeable separation element under pressure, said source gas comprising oxygen and nitrogen, and said semipermeable separation element comprising (i) a porous substrate, and (ii) a film formed on said porous substrate; said film comprising a silicone elastomer and a nonporous nanoparticle filler, said nanoparticle filler comprising particles of from 5 to 100 nanometers in diameter, said film having a thickness of from 0.5 to 50 microns and an oxygen enrichment selectivity of at least 30 over nitrogen; and then;
   (b) collecting a product gas from the opposite side of said separation element, with the ratio of oxygen to nitrogen being greater in said product gas than in said source gas.

2. A method according to claim 1, said separation element having an oxygen enrichment selectivity of at least 60 over nitrogen.

3. A method according to claim 1, wherein said porous substrate comprises an inorganic substrate.

4. A method according to claim 1, wherein said porous substrate comprises an organic substrate.

5. A method according to claim 1, wherein said silicone elastomer comprises methyl chlorosilane, ethyl chlorosilane, or phenyl chlorosilane.

6. A method according to claim 1, wherein said silicone elastomer comprises a curable polyorganosiloxane.

7. A method according to claim 1, wherein said silicone elastomer polymer comprises polydimethylsiloxane.

8. A method according to claim 1, wherein said nanoparticle filler is formed from a material selected from the group consisting of silica, calcium carbonate, and titanium oxide.

9. An oxygen enrichment device, comprising:
   (a) a semipermeable separation element, said semipermeable separation element comprising (i) a porous substrate, and (ii) a film formed on said porous substrate; said film comprising a silicone elastomer and a nonporous nanoparticle filler, said nanoparticle filler comprising particles of from 5 to 100 nanometers in diameter, said film having a thickness of from 0.5 to 50 microns and an oxygen enrichment selectivity of at least 30 over nitrogen; and with said separation element having a first face and a second face opposite said first face;
   (b) a source gas supply operatively connected to said first face; and
   (c) a product gas collector operatively connected to said second face.

10. An oxygen enrichment device according to claim 9, said separation element having an oxygen enrichment selectivity of at least 60 over nitrogen.

11. An oxygen enrichment device according to claim 9, wherein said porous substrate comprises an inorganic substrate.

12. An oxygen enrichment device according to claim 9, wherein said porous substrate comprises an organic substrate.

13. An oxygen enrichment device according to claim 9, wherein said silicone elastomer comprises methyl chlorosilane, ethyl chlorosilane, or phenyl chlorosilane.

14. An oxygen enrichment device according to claim 9, wherein said silicone elastomer comprises a curable polyorganosiloxane.

15. An oxygen enrichment device according to claim 9, wherein said silicone elastomer polymer comprises polydimethylsiloxane.

16. An oxygen enrichment device according to claim 9, wherein said nanoparticle filler is formed from a material selected from the group consisting of silica, calcium carbonate, and titanium oxide.

\* \* \* \* \*